Dec. 4, 1962 G. A. LYON 3,066,629
APPARATUS FOR MAKING WHEEL COVERS
Original Filed Jan. 26, 1956 4 Sheets-Sheet 1
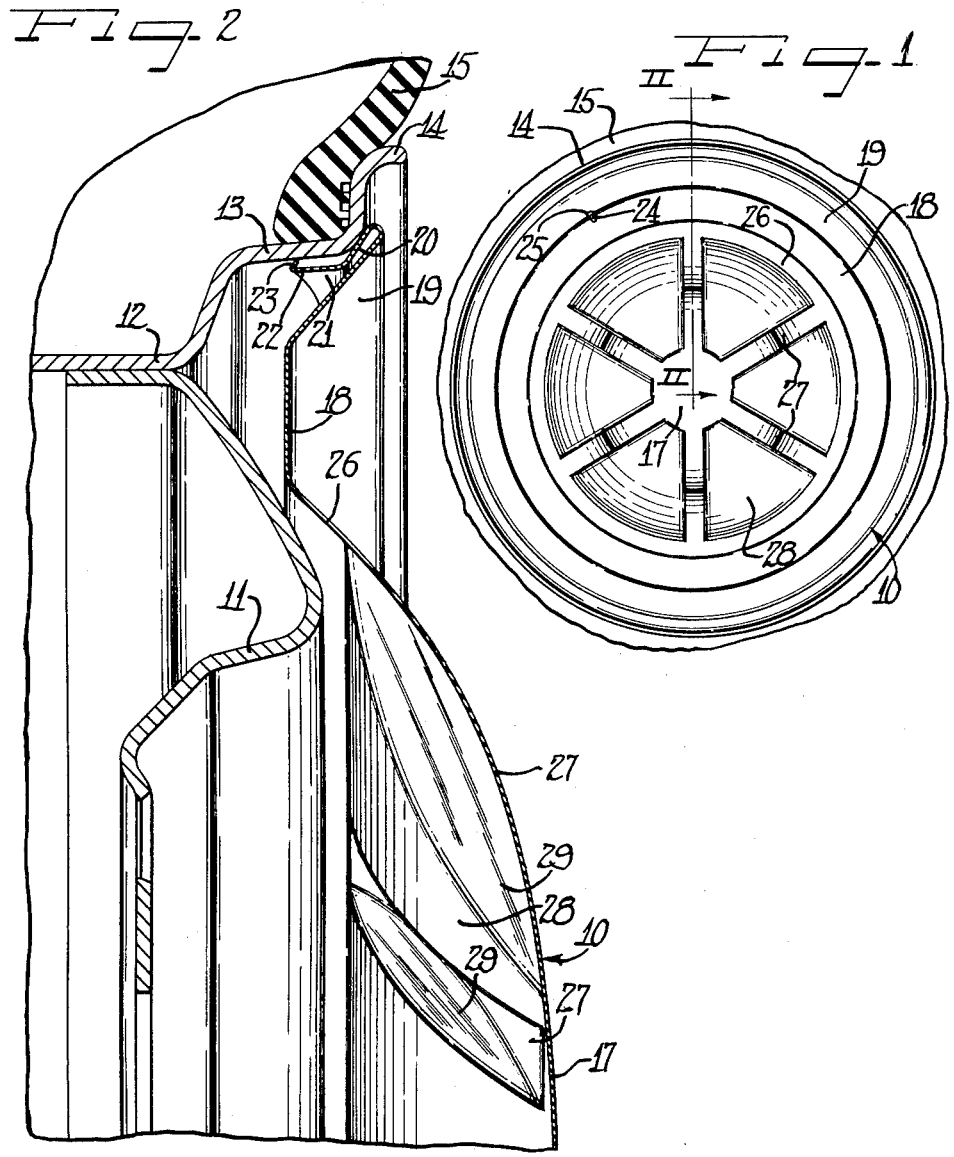
Inventor
George Albert Lyon

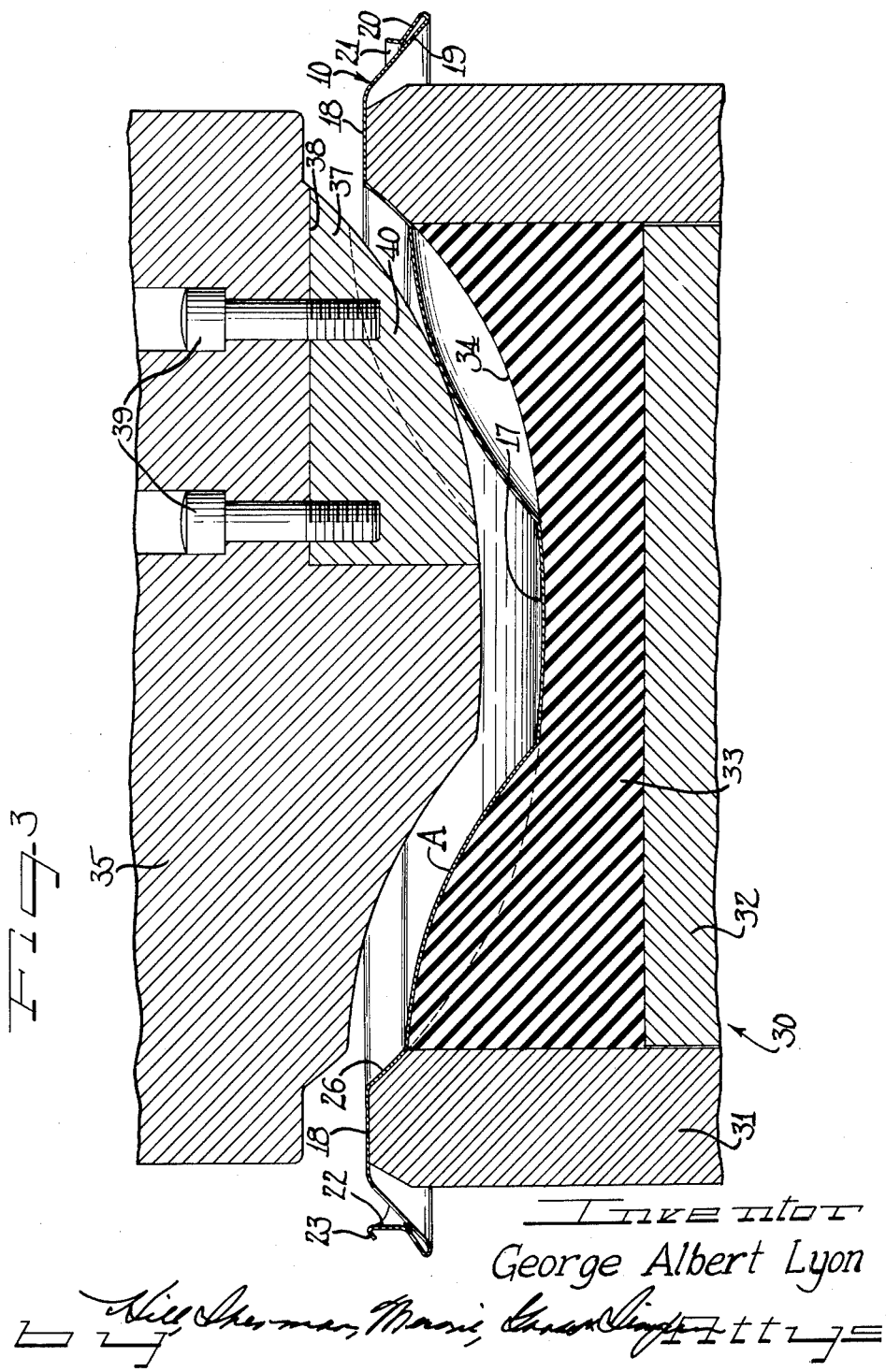

Inventor
George Albert Lyon

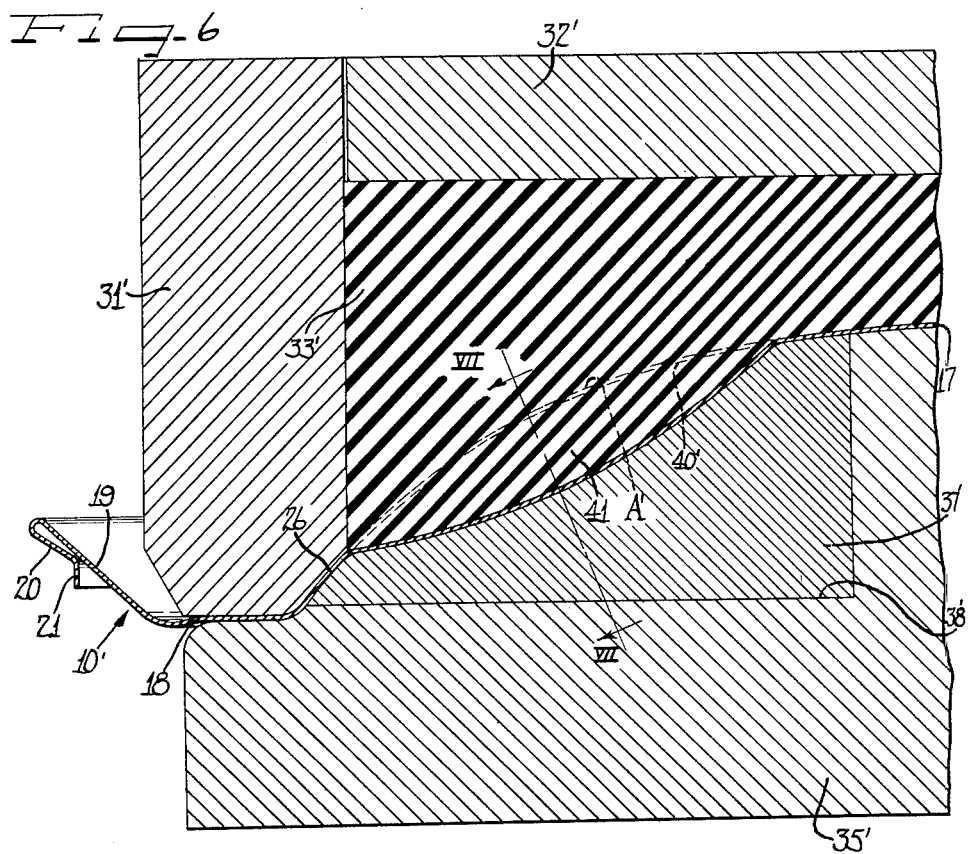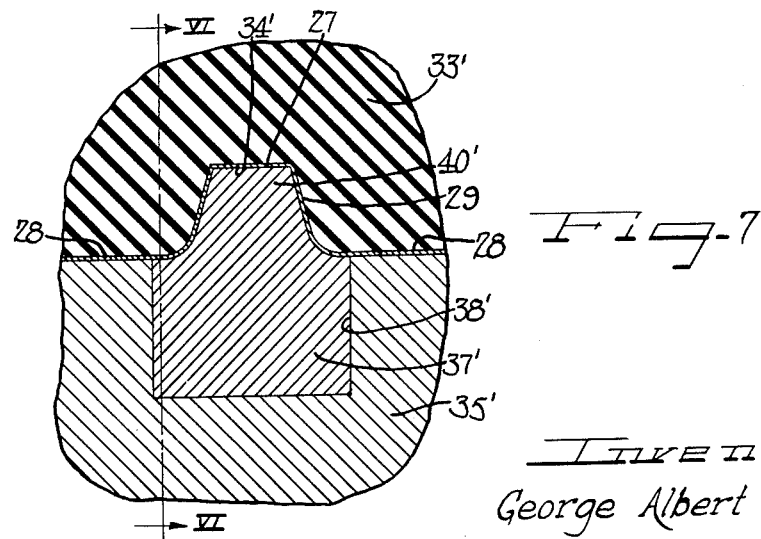

United States Patent Office 3,066,629
Patented Dec. 4, 1962

3,066,629
APPARATUS FOR MAKING WHEEL COVERS
George Albert Lyon, Detroit, Mich., assignor to Lyon Incorporated, Detroit, Mich., a corporation of Delaware
Original application Jan. 26, 1956, Ser. No. 561,453, now Patent No. 2,977,917, dated Apr. 4, 1961. Divided and this application June 17, 1958, Ser. No. 744,032
5 Claims. (Cl. 113—44)

The present invention relates to improvements in apparatus for making covers for disposition at the outer side of vehicle wheels, and more particularly concerns the attainment of novel ornamental effects in such wheel covers.

This application is a division of my application Serial No. 561,453, filed January 26, 1956, now Patent No. 2,977,917.

In the manufacture of wheel covers, sheet metal strip or plate of thin gauge is drawn into desirable configuration generally comprising working the material into circular areas to afford the preferred contour in radial cross-section. It is then desirable to polish the outer face of the cover member in order to afford the finished smooth lustrous surface finish for not only attractiveness of appearance but also ease in cleaning. However, where it is desired to provide configurations in at least certain of the circular areas, the problem arises that production polishing and buffing equipment will operate economically and efficiently primarily on continuous circular areas and where there are recesses or high points or areas interrupting the circular area surfaces costly hand polishing or buffing must be resorted to instead of automatic high speed continuous mass production high speed procedures. At least, it is generally necessary to supplement the automatic high speed polishing and buffing with manual touch-up. This is especially true where the configuration drawing is fairly shallow in depth within the permissible tensile range of the worked material of the drawn circular areas.

During working of the material into the preferred concentric circular area shape, substantial work hardening takes place, and this is especially true where substantial bending, stretching or other shaping of the material is effected incident to the shaping. Therefore, when it is desired to provide rib or spoke-like configurations in generally radial direction across a selected circular portion of the cover by displacing the material of the cover out of the plane of the selected circular area, or depressing portions of the selected circular area or areas, the problem of rupturing of the material is encountered. In such an area the ribbing or depressing displacement has heretofore necessarily been carefully controlled to a fairly shallow depth to avoid rupturing the material. This imposes rather narrow limits upon the depth and thereby the ornamental appearance of the pressed rib or spoke structure or depressed area that may be produced in the selected circular work hardened area.

An important object of the present invention is to provide apparatus for making sheet metal wheel covers with circular drawn areas having novel deeply drawn spoke or spoke-like rib formations or depressed area portions.

Another object of the invention is to provide apparatus for forming in a work hardened area of a sheet metal member such as a wheel cover, spoke or rib or depressed, configurations of substantially greater depth than would normally be permitted in such an area without fracturing incident to the drawing of the configurations.

A further object of the invention is to provide novel apparatus to improve substantially the ornamental appearance of vehicle wheel covers made from drawn sheet metal by providing the same with spoke or rib-like or depressed ornamentation of novel substantially contrasting finish appearance.

Still another object of the invention is to provide novel apparatus to attain contrasting ornamental surface appearance in a polished sheet metal surface in which all parts of the surface are initially uniformly polished to a lustrous finish.

Yet another object of the invention is to provide an improved means for providing vehicle wheel covers with spoke-like ribs or grooves or depressions of unusual depth.

Other objects, features and advantages of the present invention will be readily apparent from the following detailed description of a preferred embodiment thereof taken in conjunction with the accompanying drawings, in which:

FIGURE 1 is an outer side elevational view of a wheel structure embodying features of the present invention;

FIGURE 2 is a fragmentary enlarged radial sectional view taken substantially on the line II—II of FIGURE 1;

FIGURE 3 is a fragmentary vertical sectional view through a die assembly for pressing spoke-like ribs in a circular portion of a cover member;

FIGURE 6 is a fragmentary vertical sectional view through a modified die assembly taken substantially in the plane of the line VI—VI of FIGURE 7; and FIGURE 7 is a fragmentary sectional detail view taken substantially on the line VII—VII of FIGURE 6.

Figure 4:
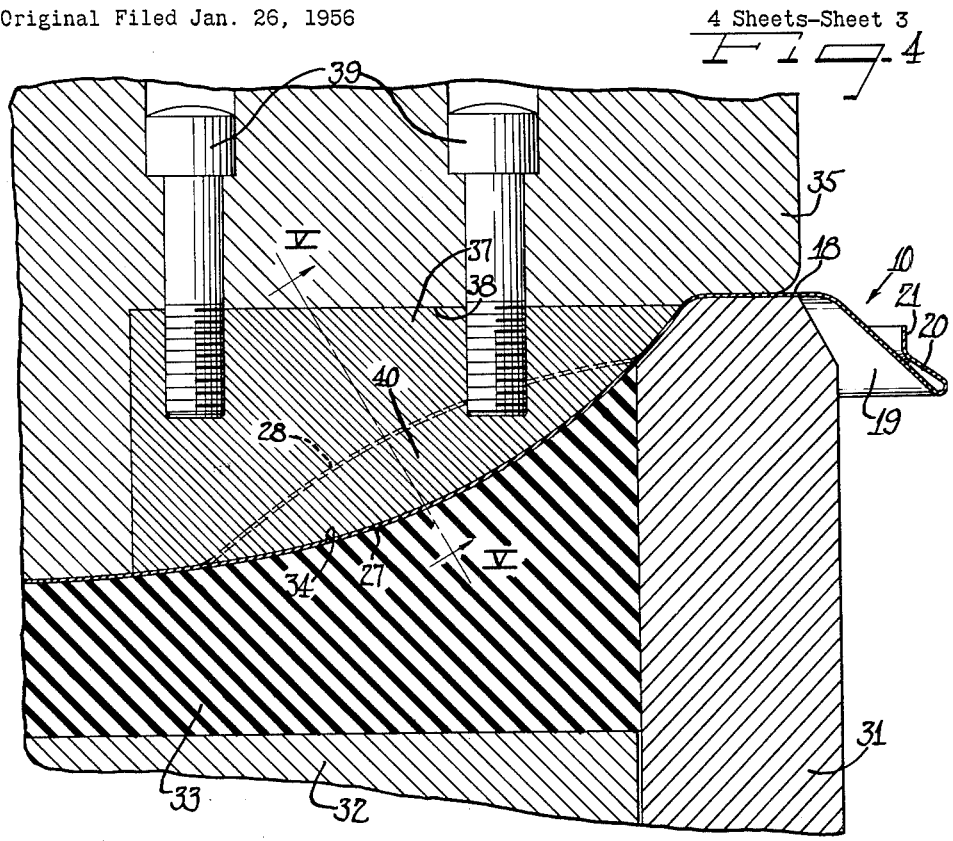
FIGURE 4 is a slightly enlarged fragmentary vertical sectional view of the right hand portion of the die set shown in FIGURE 3.

A wheel cover 10 (FIGS. 1 and 2), made with apparatus according to the present invention is constructed and arranged to be applied in press-on, pry-off relation to the outer side of a vehicle wheel which may be of the conventional type having a disk spider wheel body 11 carrying a multiflange, drop center tire rim 12 having an intermediate generally radially inwardly facing and axially and radially outwardly sloping flange 13 merging with a terminal flange 14. The tire rim is adapted to support a pneumatic tire and tube assembly, or a tubeless tire 15 as shown.

The wheel cover 10 comprises a one piece sheet metal stamped and drawn circular body having a central crown portion 17 for overlying the central portion of the wheel body 11 and merging with an intermediate annular inwardly dished portion 18 from which extends generally radially and axially outwardly an outer annular marginal portion 19 for overlying the tire rim 12.

Means are provided for press-on, pry-off retention of the cover 10 on the wheel. Herein such retaining means are of the kind covered in my Patent No. 2,624,634, issued January 6, 1953. To this end the outer marginal portion 19 of the cover has an underturned generally radially and axially inwardly extending continuous flange 20 adapted in assembly to bottom against the outer side of the tire rim adjacent juncture of the intermediate and terminal flanges thereof. Extending generally axially inwardly from the flange 20 is a continuous annular flange portion 21 that is of a smaller diameter than the axially outer portion of the intermediate flange 13 and has a series of generally axially inwardly extending finger extensions 22 provided with cover retaining terminals in the form of short and stiff radially and axially outwardly projecting terminal flanges 23 which are engageable in gripping retaining relation against the inner surface of the intermediate flange 13 under resilient tension of the retaining fingers 22 and the continuous flange 21 from which the fingers extend.

To apply the cover to the outer side of the wheel it is generally centered with respect to the wheel and with a valve stem 24 extending through a suitable valve stem aperture 25 in the marginal portion of the cover.

Then the cover is pressed axially inwardly to effect uniform engagement of the retaining fingers 22 with the tire rim flange 13. There may be from 8 to 16 of the retaining fingers 22, as preferred.

In making the cover 10, the method covered in my issued Patent 2,707,449 dated May 3, 1955, may be used.

In order to attain novel, ornamental styling effect, it may be desirable to provide the cover 10 with an arrangement of spoke ribs 27 and intermediate grooved portions 28 in a circular area of the cover body. In the present instance such circular area comprises the side wall of the crown 17. On the other hand, it could just as well comprise the intermediate dished annular cover portion 18. In the illustrative embodiment shown in FIGURE 1, the outwardly projecting ribs 27 are disposed in generally spoke-like radial arrangement emanating from a central portion of the crown 17 and merging at their ends in an annular radially outer and axially inner extremity portion 29 of the crown adjacent juncture thereof with the dished in annular portion 18 of the cover. The spoke ribs 27 are preferably substantially narrower than the intermediate dished in portions 28 of the crown. Each of the spoke-ribs 27 projects substantially outwardly beyond the dished in portions 28 and has, in the present instance, a crown that is of substantial width and is arched outwardly while opposite side walls 29 merge into the intermediate dished in or depressed portions 28.

In view of the cold working to which the material of the crown 17 is subjected in drawing the same to shape, relative pressing of the material in the circular portion of the crown in which the ribs 27 and the intermediate dished portions 28 are formed would normally have to be carefully controlled to a limited extent in order to avoid rupturing the material. However, it will be observed that at the longitudinal center portions of the ribs 27 they are of quite substantial depth relative to the dished in intermediate portions 28. This is accomplished according to the present invention by selectively or locally annealing the circular area of the cover in which the ribs 27 are formed. That is, after the cover has been fully drawn and shaped including formation of the cover retaining underturned marginal flange structure, the circular area of the cover to be ribbed is fully annealed to return it substantially to the original unworked softness. Since it is highly desirable to maintain full work hardening and thereby resilience in the outer marginal portion 19 and the retaining flange structure 20, 21 and the fingers 22, such portions of the cover are carefully shielded and protected against annealing thereof.

Satisfactory annealing results can be secured by electronic induction heating or by gas heating the selected circular area of the cover body. For example, with AISI type 301 chromium-nickel stainless steel, heating of the selected circular area of the cover body to 1750–2000° F. for approximately seven seconds by induction heating will produce the desired annealed effect. With gas heating of the selected area, the annealing temperature may be held for approximately forty seconds after the temperature is attained following application of the gas heat.

If preferred, the selected annular area may be annealed by the salt bath process, wherein a suitable salt is maintained in a molten condition at the proper annealing temperature. For said chromium-nickel stainless 1800° F. to 1975° F. for one minute has been found suitable.

With other types of material, such as AISI type 430 stainless ferritic chromium steel having a lower recrystallization temperature, the annealing temperature must, of course, be held properly to not over 1500° F. Proper adjustments in this regard will therefore be in order conformable to the material employed.

In the present instance, since the spoke-ribs 27 are the narrowest relative to the intermediate portions 28, a preferred mode of shaping comprises initially drawing the side of the crown 17 into a circular dished form A (FIGURE 3) conformable to the desired dished configuration of the ultimate idented intermediate portions 28. Since in this condition of the cover the outer surface configurations are all of circular pattern the outer surface of the cover is conveniently polished to a high luster in automatic high speed equipment. However, before polishing, the circular dished section A is annealed to substantially dead soft, that is to substantially the softness of the material before cold working.

Then, for pressing the spoke ribs 27 in the annealed section A, the polished cover is inserted into a die set 30. This includes a circular upstanding supporting die ring member 31 which is conformed to engage within the intermediate dished portion 18 and against the circular crown extremity portion 29. Supported in secured relation on a base 32 and confined closely within the supporting die ring 31 is a female shaping die block 33 which is formed from an elastomeric resilient material such as rubber and has the upper surface thereof shaped conformable to the outer surface of the crown 17 and the dished surface of the circular annealed cover portion A. At intervals corresponding to the ribs 27 to be formed in the annealed portion A, the cushion die block 33 is provided with radial slots 34 which are of complementary shape to the outer surface to be formed on the ribs 27. It will be observed that the outer, polished surface of the cover is placed upon the rubber die member 33.

Cooperatively related to the lower supporting die assembly is an upper punch die member 35 which has a lower surface which is generally conformed to the inside surface of the cover crown including the dished in annular portion A. At the circumferentially spaced positions conformable to the ribs 27 to be formed in the cover portion A, and complementary to the groove or slot recesses 34 in the cushion die member 33, the punch die 35 has hardened steel block rib forming inserts 37 secured in suitable recesses 38 in the face of the die member by means of screws 39. This enables the rib forming insert blocks to be made of a harder material than the rest of the punch 35 and to be removed when necessary for sharpening or replacement.

Figure 5:
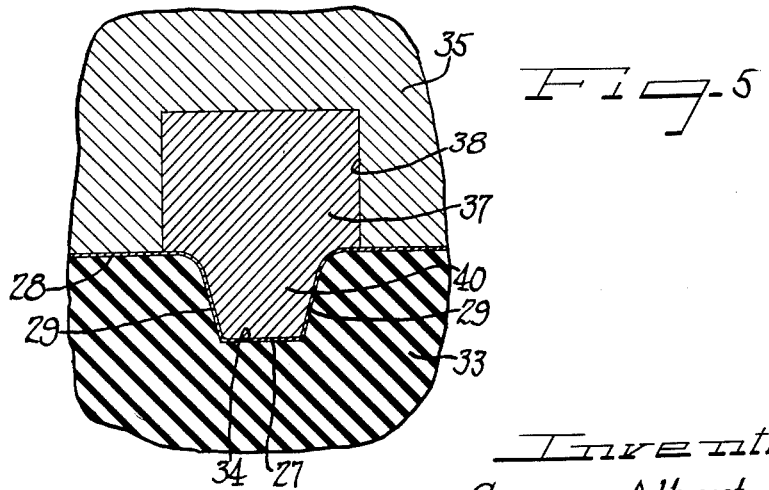
FIGURE 5 is a fragmentary sectional detail view taken substantially on the line V—V of FIGURE 4.

Upon comparison of FIGURE 3 with FIGURE 4, it will be observed that when the punch die 35 is driven down against the cover, rib forming projections 40 of the inserts 37 registering with the rib grooves 34 of the cushion and forming block 33 will draw and bend the material of the section A overlying the grooves 34 into the grooves and thus form the ribs 27 therein. As seen in FIGURE 5, the forming nose extensions 40 are complementary to and in the fully pressed in relation fit down into the forming grooves 34 to afford smooth uniform shape to the pressed ribs 27, while the remainder of the annealed section A of the cover remains in the dished original shape to provide the intermediate sections 28. It will be observed that by having the bottoms of the grooves 34 merge smoothly with the peak 17 and with the crown extremity portion 29 at the opposite end, the resulting crowns or ridges of the spoke ribs 27 wlil merge similarly as best visualized in FIGURES 2 and 4.

The cushioning resilient nature of the female die block 33 avoids marring of the polished surface of the cover during the rib drawing operation.

After the ribs have been formed, the die sections are separated and the formed cover 10 removed. The outer surface of the cover is then buffed and degreased and if desired is plated.

It has been found that the annealing enables much deeper drawing of the ribs than when the area A is not annealed. Furthermore, a hghly desirable result of the deep drawing of the spoke ribs 27, as accomplished by the described method, resides in that the spoke ribs, or at least the outer surfaces of the sides 29 of the spoke ribs are provided with substantially contrasting finish appearance as compared to the surface of the intermediate portions 28 or the remainder of the outer face surface areas of the cover, especially where the entire outer surface of the cover has been polished prior to the rib drawing steps. This contrasting finish effect arises due to the stretching of the material in the ribs when displacing the same from the dished original position of the material to the final deeply drawn displaced position thereof. Due to such stretching, the polished surface assumes a satiny, non-lustrous appearance. Where the crests of the ribs 27 are, subsequent to the drawing thereof, buffed, they will resume a polished or shiny appearance but the sides 29 of the ribs will remain with the satiny finish. Plating of the outer face of the cover as by flash chrome plating maintains the contrasting finish of the several surface areas. Thus, there is afforded a desirable contrast in the finish of the cover emphasizing the spoke ribs in the finished cover. Of course, if a more intense contrast is desired the intermediate areas 28 may be painted or enameled but this adds a cost factor that is unnecessary in view of the novel contrasting finish attainable as described hereinabove.

It has been found that a highly desirable ornamental effect is attained where instead of ribs or spoke configurations being pressed out of a dished area, the areas intermediate the desired spoke or rib configurations are pressed or displaced to provide depressions of substantial depth between the spoke portions. In such event not only the sides of spoke portions but also the entire depressed areas between the spoke portions are provided with the satiny finish. For this purpose the forming die structure of FIGURES 3, 4 and 5 is reversed as shown in FIGURES 6 and 7. That is, the punch portion 35 becomes a female die member 35′ supporting a series of hardened rib die blocks 37′ mounted in appropriate recesses 38′ in the die member 35′. In this instance, however, the rib or spoke noses or projections 40′ of the blocks 37′ are shaped on their crests to the same longitudinal contour as the transverse or radial contour of the dished circular annealed and polished area A′ of the cover blank which for this purpose is initially dished into outward convex form such as a continuation of the crown contour of the cover member.

In this modification, the die structure that in FIGURES 3 through 5 was the supporting structure becomes the male punch structure and includes the ring die member 31′ and a base die member 32′ providing a cavity within which a rubber or other suitable elastomeric pressure die member 33′ is mounted. After the cover member has been centered upon the lower die member 35′ with the circular portion A′ resting upon the ribbing die members 37′, the die assembly 31′, 32′, 33′ is driven down into engagement with the axially outer face of the cover member. This causes annularly aligned portions 41 of the resilient forming die member 33′ intermediate the rib forming recesses 34′ complementary to the ribbing die portions 41′, and bulged oppositely to the initial or normal convex bulge of the cover portion A′, to stretch and draw the areas of the cover portion A′ between the ribbing die portions 40′ generally axially inwardly to provide corresponding depressed areas 28 in the cover. Since the thus depressed and stretched areas 28 and the rib sides 29 are worked relative to the crest portions of the ribs 27, which in this modification of the method are maintained unstretched and in the original plane of the cover portion A′, the originally polished surface of the cover areas 28 and the rib sides 29 are converted into a substantially uniform satin finish. This affords an overall pleasing contrasting finish for the depressed cover areas 28 and the rib sides 29 and the crests of the ribs 27 as well as the contiguous crown 17 as well as the radially outer adjacent annular cover areas 26 and 19 which remain in the highly polished condition. Furthermore, even though the relative drawing of the areas 28 is substantial and deep, tearing or buckling or undue strain upon any portion thereof is avoided due to the annealing to which at least the area A′ has been subjected prior to the drawing of the areas 28.

It should be observed that the satin or satiny finish produced according to the present invention is something quite different from a frosted or rubbed finish. A frosted finish may be effected by etching or sand blasting whereby particles are removed by the etching solution or by the sand grains impinged at high velocity against the surface or displaced by the force of the sand grains to form pits in the surface, whereby to effect diffusion of light striking the surface that has been treated. The result of etching or sand blasting is to effect an alteration of the surface by externally applied means. Such means are necessarily applied after the article has been drawn to shape and in the case of intricate shapes, especially, are very difficult to apply uniformly so as to gain a uniform finish. In any event, the superficial surface alteration mode of treatment is time consuming and expensive.

On the contrary, the action of the present apparatus on the material of the present invention effects an internal structural change in the characteristics of the material in the worked polished surface areas whereby the satin finish results from the actual grain displacement of the stretched material surface incident to the drawing whereby the uniform quite smooth light diffusing satin finish is attained. Best results have been produced where in the annealing the grain size is controlled to be between seven and nine. In a wheel cover the smoothness and uniformity of the satin finish surface with freedom from tool marks or pits or other surface irregularities or roughness is of substantial importance since the surfaces of wheel covers are inherently subject to road dirt adherence in service and must be easily cleanable.

It will be understood that modifications and variations may be effected without departing from the scope of the novel concepts of the present invention.

I claim as my invention:

1. In die apparatus especially adapted for shaping predetermined limited areas of a polished sheet metal member to effect controlled stretching of the predetermined limited areas, a pair of relatively reciprocably opposed and coactive die assemblies, one of said die assemblies including a rigid circumscribing confining wall defining a cavity therein having a rigid bottom portion, said cavity having mounted therein an elastomeric die member having a preformed surface engageable with a preformed and polish metal member surface, said elastomeric die member surface having therein recesses of predetermined shape and relatively great depth, the other of said die assemblies providing a rigid surface complementary to the surface of the elastomeric die member and having forming projections of shape and depth complementary to the recesses in the surface of the elastomeric die member for interfitting relationship therein, said die assemblies being operable to press the metal member therebetween with the opposing faces of the elastomeric die member and said remaining die assembly firmly engaging the complementary shape of the sheet metal member and said projections drawing complementary portions of the sheet metal member into said relatively deep recesses in the elastomeric die member, whereby the polished surface of the metal member is maintained by the elastomeric die member and the other of said die assemblies in its preformed shape with the exception of the pressing of said areas thereof into said recesses to stretch the material of the metal member where engaged by said projections into said recesses, thus to effect a grain displacement of the stretched material surface in contact with the elastomeric die member for producing a smooth but satiny contrasting light-diffusing area.

2. In die apparatus especially adapted for shaping predetermined limited areas of a polished sheet metal member to effect controlled stretching of the predetermined limited areas, a pair of relatively reciprocably opposed and coactive die assemblies, one of said die assemblies including a rigid, circumscribing confining wall defining a cavity therein having a rigid bottom portion, said cavity having mounted therein an elastomeric die member having a preformed surface engageable with a preformed and polished metal member surface, said elastomeric die member surface having therein recesses of predetermined shape and relatively great depth, the other of said die assemblies providing a rigid surface complementary to the surface of the elastomeric die member and having forming projections complementary to the recesses in the surface of the elastomeric die member and of corresponding depth, said die assemblies being operable to press the metal member therebetween with the opposing faces of the elastomeric die member and said remaining die assembly firmly engaging the complementary shape of the sheet metal member and said relatively deep projections drawing complementary portions of the sheet metal member into said relatively deep recesses in the elastomeric die member, whereby the polished surface of the metal member is maintained by the elastomeric die member and the other of said die assemblies in its preformed shape with the exception of the pressing of said areas thereof into said recesses to stretch the material of the metal member where engaged by said projections into said recesses, to effect a grain displacement of the surface of said area pressed into said recesses in contact with the elastomeric member affording a smooth and satiny surface of light-diffusing characteristics, said confining wall portion providing a complementary surface engageable with a complementary surface of the sheet metal member about said elastomeric member and said other die assembly having a portion complementary to said confining wall portion as a stop to limit the pressure of the projections into the elastomeric die member.

3. In an apparatus for drawing transversed ribs in an annular annealed area of a sheet metal cover member, a supporting structure including an elastomeric body with a rigid encircling confining element, said body having a surface thereof contoured complementary to a cover member to be engaged thereby and provided with deeply recessed transverse grooves in the portion of the body to receive said annealed cover area, and a complementary die member having a surface thereof contoured complementary to said body and provided with correspondingly deep transverse ribs complementary to said grooves and engageable with said annealed cover area to form ribs in said grooves and adjacent offset areas between said ribs, said ribs on said complementary body member having a depth such as to effect grain displacement in selected surface areas of the annular annealed areas of the sheet metal cover member such as to provide a smooth satiny surface characteristic having light-diffusing effects.

4. In apparatus for making wheel covers, a die set including an elastomeric member having a surface thereof contoured to engage a cover member in substantially full-face contact except for deep rib grooves in a portion of said surface, confining means for said elastomeric member effective to minimize lateral displacement of the elastomeric member, and an opposing metal member having a surface that is complementary to and engageable with the cover surfaces on the opposite side from said elastomeric member and having rib projections complementary to said grooves and of corresponding depth, and engageable with the cover to press alternate ribs and offset areas into the cover member upon bringing the die members into engagement with the cover member therebetween, the depth of said ribs on said metal member being such as to effect grain displacement in predetermined surface areas of said cover such as to provide a smooth, satiny effect affording contrasting light-diffusion.

5. In apparatus for making wheel covers, a die set including a metal member having the surfaces thereof contoured to provide a series of ribs with relatively wide recesses therebetween, an elastomeric die member, confining means for said elastomeric die member, said elastomeric die member defining relatively deep recesses complementary to and receptive of said ribs, said ribs being correspondingly deep to draw a cover member resting thereon so that areas engaged by the ribs are drawn into said recesses and areas between the ribs are stretched to afford lateral grain displacement in the cover surfaces adjacent to the elastomeric member, upon meeting engagement of the die members so that both rib portions and adjacent offset areas in the cover member thus formed are given a smooth, satiny finish having contrast-light-diffusing characteristics.

References Cited in the file of this patent

UNITED STATES PATENTS

| D. 173,278 | Lyon | Oct. 19, 1954 |
| 839,839 | Hallowell | Jan. 1, 1907 |
| 1,400,416 | Cameron | Dec. 13, 1921 |
| 1,819,257 | Multhaupt | Aug. 18, 1931 |
| 2,183,800 | Whistler | Dec. 19, 1939 |
| 2,246,204 | Graf | June 17, 1941 |
| 2,280,359 | Trudell | Apr. 21, 1942 |
| 2,390,803 | Marschner | Dec. 11, 1945 |
| 2,474,853 | Lyon | July 5, 1949 |
| 2,714,226 | Axelrad | Aug. 2, 1955 |

FOREIGN PATENTS

| 220,766 | Great Britain | Aug. 28, 1924 |